L. D. WILSON.
PRESERVING HOUSE.
APPLICATION FILED OCT. 2, 1912.
1,059,803.
Patented Apr. 22, 1913.
3 SHEETS—SHEET 1.
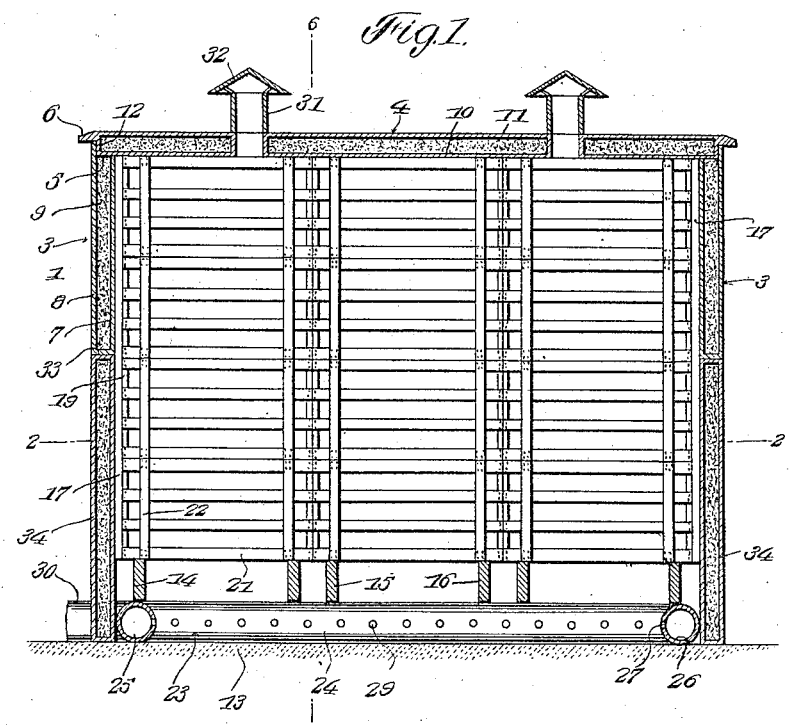
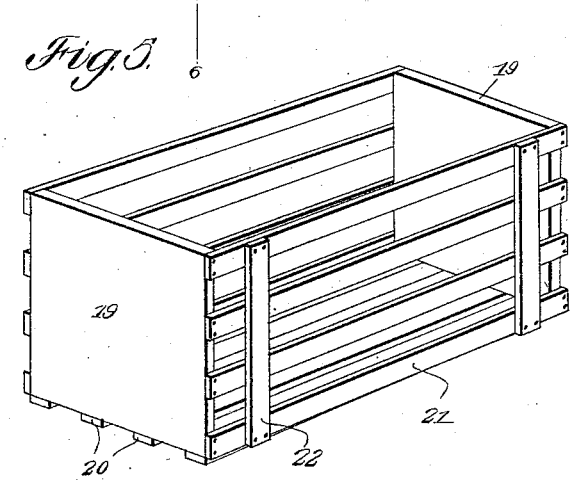
Witnesses
J. H. Crawford
James Roselle
Inventor
L. D. Wilson,
By Victor J. Evans
Attorney

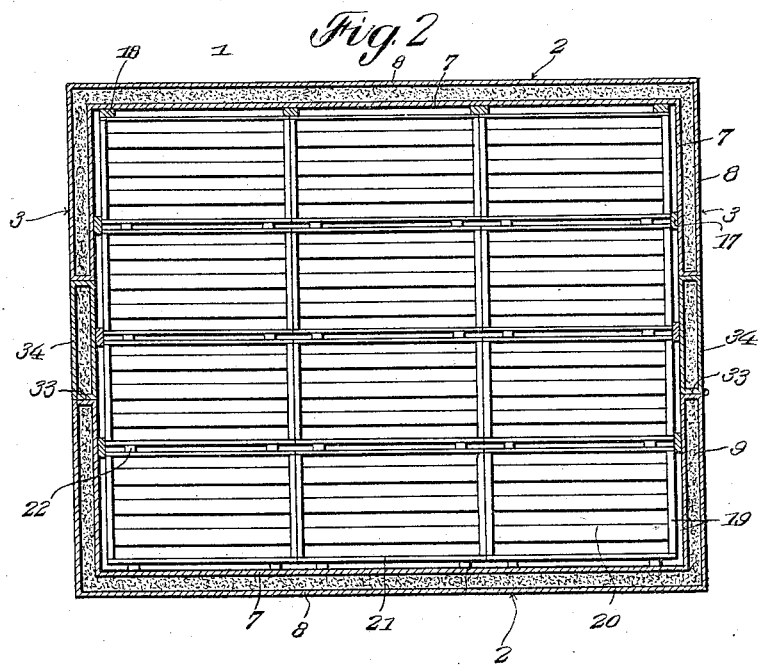

L. D. WILSON.
PRESERVING HOUSE.
APPLICATION FILED OCT. 2, 1912.

1,059,803.

Patented Apr. 22, 1913.

3 SHEETS—SHEET 3.

Witnesses
J. H. Crawford
James Koehl

Inventor
L. D. Wilson,
By Victor J. Evans
Attorney

UNITED STATES PATENT OFFICE.

LUTHER D. WILSON, OF BOONEVILLE, ARKANSAS.

PRESERVING-HOUSE.

1,059,803. Specification of Letters Patent. Patented Apr. 22, 1913.

Application filed October 2, 1912. Serial No. 723,551.

*To all whom it may concern:*

Be it known that I, LUTHER D. WILSON, a citizen of the United States, residing at Booneville, in the county of Logan and State of Arkansas, have invented new and useful Improvements in Preserving-Houses, of which the following is a specification.

This invention relates to preserving houses for potatoes, onions or such vegetables or fruits that are liable to rapid decay unless exposed to a drying medium such as dry outside air, an object of the invention being to provide a preserving house of minimum size or proportion and the maximum storing surface, one which will be moisture and frost proof to protect the perishable goods from the elements, and one wherein a fresh supply of air may be held in constant circulation around the goods.

Another object of the invention is to combine with the store house structure, crates which are identical in construction and formed for association relatively and with adjacent walls of the house so as to encourage a proper air circulation.

Figure 3:
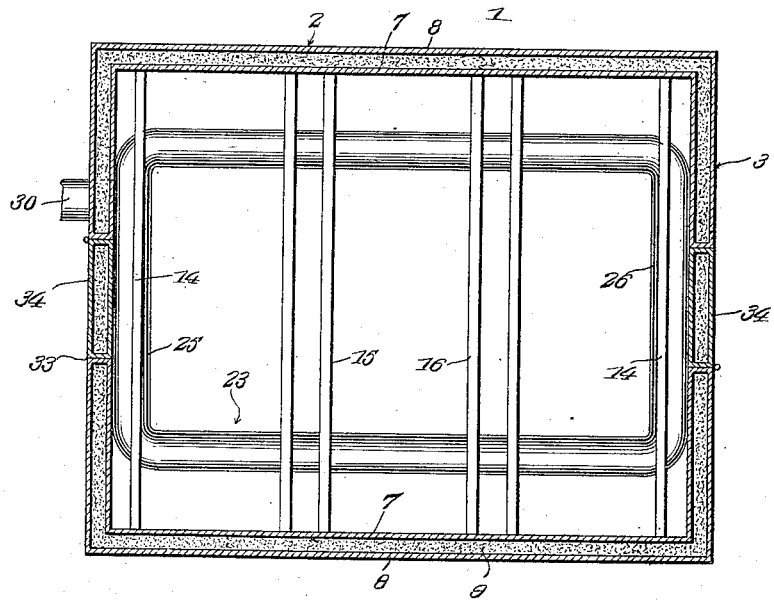
Figure 6:
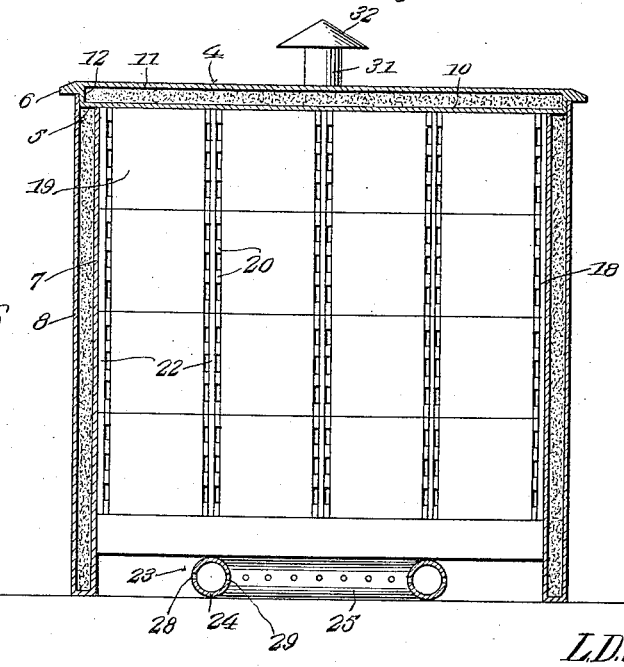

In the drawing forming a portion of this application, and in which like letters of reference indicate similar parts in the several views: Figure 1 is a longitudinal section through the store house showing the crates operatively arranged therein. Fig. 2 is a horizontal section taken on line 2—2 of Fig. 1. Fig. 3 is a view similar to Fig. 2 showing the crates removed. Fig. 4 is a perspective view of the air conduit. Fig. 5 is a perspective view of one of the crates. Fig. 6 is a section taken on line 6—6 of Fig. 1.

The preserving house comprises an inclosure 1 which is provided with side walls 2, end walls 3 and a top 4, a rabbeted formation of the said side and end walls being formed at 5 to accommodate said top 4 so that a moisture proof connection is formed between the top and said adjacent walls of the structure. The top carries a guard 6 which projects beyond the side and end walls as shown in Fig. 1 so as to prevent moisture from settling in the joint between the top and the adjacent side and end walls. The side and end walls are each formed of inner and outer spaced portions 7 and 8, the space between said portions containing saw dust 9 or some other suitable well known insulating material which will prevent absorption of frost through the walls. The top 4 is formed of similar inner and outer portions 10 and 11 and connecting vertical portions 12. Insulating material such as saw dust is also interposed between the spaced portions 10 and 11 of the top as shown in Fig. 1. The inclosure when formed as described may be mounted upon a masonry foundation 13. The inclosure may be built upon the surface of the ground or it may be arranged below the surface as may be found obviously beneficial from experience.

A slatted or like foraminous bottom of the inclosure comprises end bars 14 and intermediate sets or pairs of similar bars 15 and 16. The bars 15 and 16 are spaced relatively while the bars 14 are spaced from the adjacent end walls 3 as shown. Spacing bars or like elements 17 are secured to and arranged vertically on the inner portions 7 of the end walls 3 while similar vertical spacing bars 18 are secured to the inner portions 7 of the side walls 2. Especially designed crates are used in connection with the specific interior construction of the inclosure 1 and as shown each crate comprises spaced end heads 19 that are connected by longitudinal relatively spaced bottom slats 20 and similar side slats 21 while at one side each crate is provided with vertical spacers 22. The crates as shown in Fig. 1 are piled one on another throughout the height of the inclosure. The crates are also arranged side by side in respective rows. The heads of the crates adjacent to the end walls 3 have contact with the vertical spacers 17 while the longitudinal superimposed rows of crates abut against the spacers 18 on one of the side walls 2. Upon reference to Fig. 2 it is now apparent that the spacers 22 separate the adjacent crates from each other so as to provide ventilating passages therebetween while certain of the crates are spaced from adjacent walls of the inclosure through the elements 17 and 18 previously described. This last named construction furnishes ventilating passages between the outermost crates and the said adjacent walls of the inclosure.

With a view to thoroughly ventilating the interior of the inclosure I provide a conduit 23 beneath the slatted like bottom of the inclosure. Said conduit is preferably provided with longitudinal legs 24 and connecting end legs 25 and 26, the latter having a single longitudinal row of jet passages 27 therein from which blasts of air are adapted to discharge downwardly and laterally.

Each longitudinal leg 24 is provided with an outer series of jet passages 28 and an inner longitudinal row of similar passages 29. The leg 22 carries a branch 30 which may be connected in any suitable well known form of air source, such as a circulating fan, not shown. In this manner it is seen that air entering the branch 30 will be discharged to the respective legs 24 and 26, after which jets of air will emanate from the passages 27, 28 and 29 to be distributed throughout the transverse area and through the vertical area within the inclosure. In this manner the perishable goods will be directly exposed to the circulating air and treated thereby in a manner which will satisfactorily preserve the goods. The top 4 of the inclosure is provided with ventilating chimneys 31 and over each chimney is disposed a hood 32 to protect the articles to be preserved from the outside elements. The chimneys are also arranged so as to induce a proper circulation of air in the preserving chamber of the structure. Each end wall 3 of the inclosure is provided with a door way 33 and a suitable closure 34 therefor.

In filling the preserving chamber with the crates one of the doors 34 is opened whereby to permit one to carry the crates therethrough and to properly arrange them in transverse rows upon the slatted like bottom of the inclosure. After the bottom has been entirely covered additional crates can be placed on top of the first crates until the inclosure is filled to its capacity. The doors 34 are then properly closed, and air is then introduced to the preserving chamber of the structure in a manner hereinbefore described.

I claim:—

1. A preserving house comprising an inclosure having a slatted bottom, crates mounted upon the bottom, means spacing the crates from each other, means for spacing the crates from adjacent walls of the inclosure, and means beneath the slatted bottom of the crate for introducing a preserving medium within the inclosure and around the crates.

2. A preserving house comprising an inclosure having a slatted bottom, substantially foraminous preserving crates removably mounted in the inclosure and superimposed with relation to the slatted bottom thereof, means for spacing the crates relatively, means for spacing the crates from adjacent walls of the inclosure, and means for introducing a preserving medium to the inclosure beneath the slatted bottom thereof.

3. A preserving house comprising an inclosure having a slatted bottom, means for introducing a preserving medium to the inclosure from beneath the bottom, companion crates wholly occupying the interior of the inclosure above said slatted bottom, means for spacing the crates relatively, and means for spacing the crates from adjacent walls of the inclosure.

4. A preserving house comprising an inclosure having a slatted bottom, crates removably mounted within the inclosure and disposed above said bottom thereof, spacers on each crate, the spacers of one crate being engaged against the spacers of an adjacent crate whereby the different crates are spaced relatively at their sides, spacers carried by the side and end walls of the inclosure and engaging against adjacent crates, and means for introducing a preserving medium to the inclosure from a point beneath the slatted bottom thereof.

In testimony whereof I affix my signature in presence of two witnesses.

LUTHER D. WILSON.

Witnesses:
A. J. McAmis,
J. M. Outhout.

---

Copies of this patent may be obtained for five cents each, by addressing the "Commissioner of Patents, Washington, D. C."